United States Patent [19]
Barrett

[11] Patent Number: 4,877,206
[45] Date of Patent: Oct. 31, 1989

[54] CONCRETE DELIVERY TROLLEY

[76] Inventor: Lamar Barrett, 108 Pine Cone Cir., Clanton, Ala. 35045

[21] Appl. No.: 197,210

[22] Filed: May 23, 1988

[51] Int. Cl.$^4$ .............................................. F16L 3/00
[52] U.S. Cl. ..................................... 248/49; 182/183; 182/184; 182/185; 182/224; 212/218
[58] Field of Search ............... 248/49, 55; 212/218, 212/209; 269/71, 73; 182/183, 184, 185, 224

[56] References Cited

U.S. PATENT DOCUMENTS

| 827,575 | 7/1906 | Smead | 248/55 |
| 2,343,014 | 2/1944 | Langan | 212/218 |
| 2,641,428 | 6/1953 | Kirk et al. | 248/55 |
| 3,298,644 | 1/1967 | Sherburne | 248/55 |
| 3,390,854 | 7/1968 | Sherburne | 248/55 |
| 3,826,196 | 7/1974 | Wallace | 212/218 |

FOREIGN PATENT DOCUMENTS

| 275559 | 5/1951 | Switzerland | 212/218 |
| 442179 | 1/1968 | Switzerland | 182/185 |

Primary Examiner—Alvin C. Chin-Shue
Assistant Examiner—David L. Talbott
Attorney, Agent, or Firm—Jennings, Carter, Thompson & Veal

[57] ABSTRACT

A trolley for positioning a concrete delivery conduit in a work area utilizes a carriage member movable along a support beam to carry a pipe engaging cradle. The carriage and cradle permit the conduit to be moved laterally and axially without substantial exertion. The support beam is mounted on adjustable stands to position the conduit at a selected height.

15 Claims, 4 Drawing Sheets

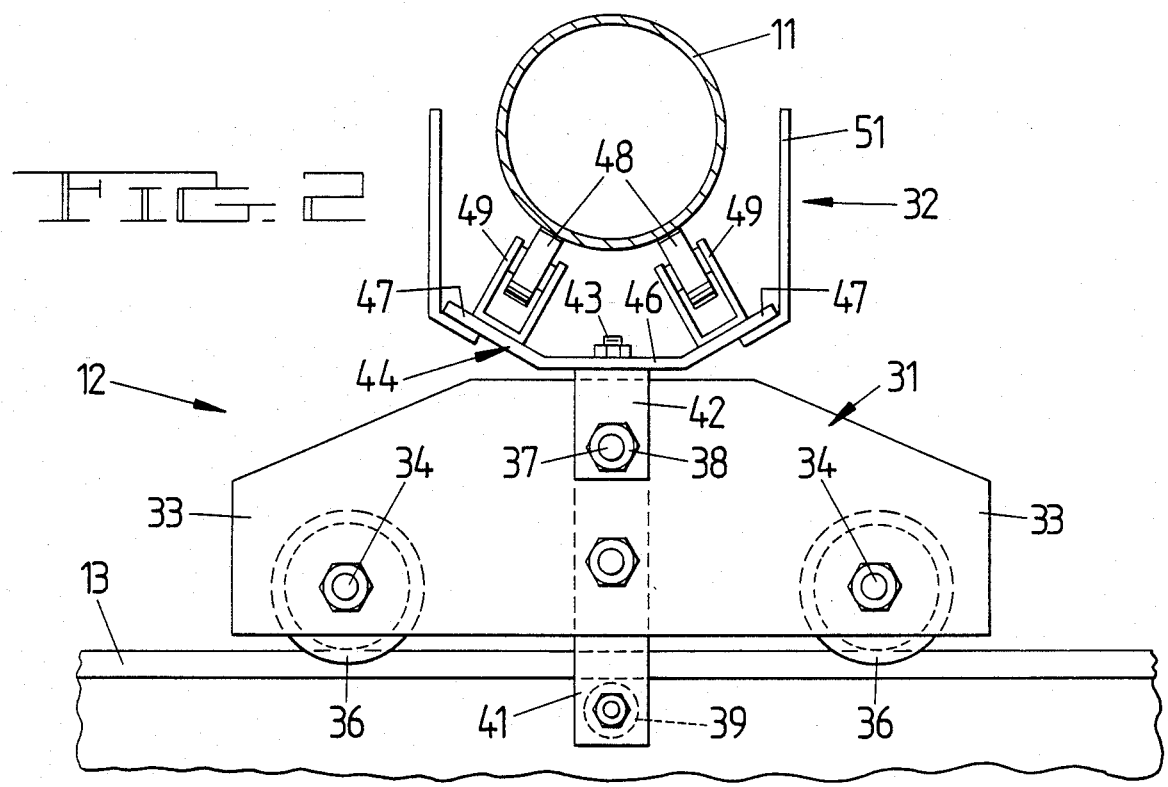
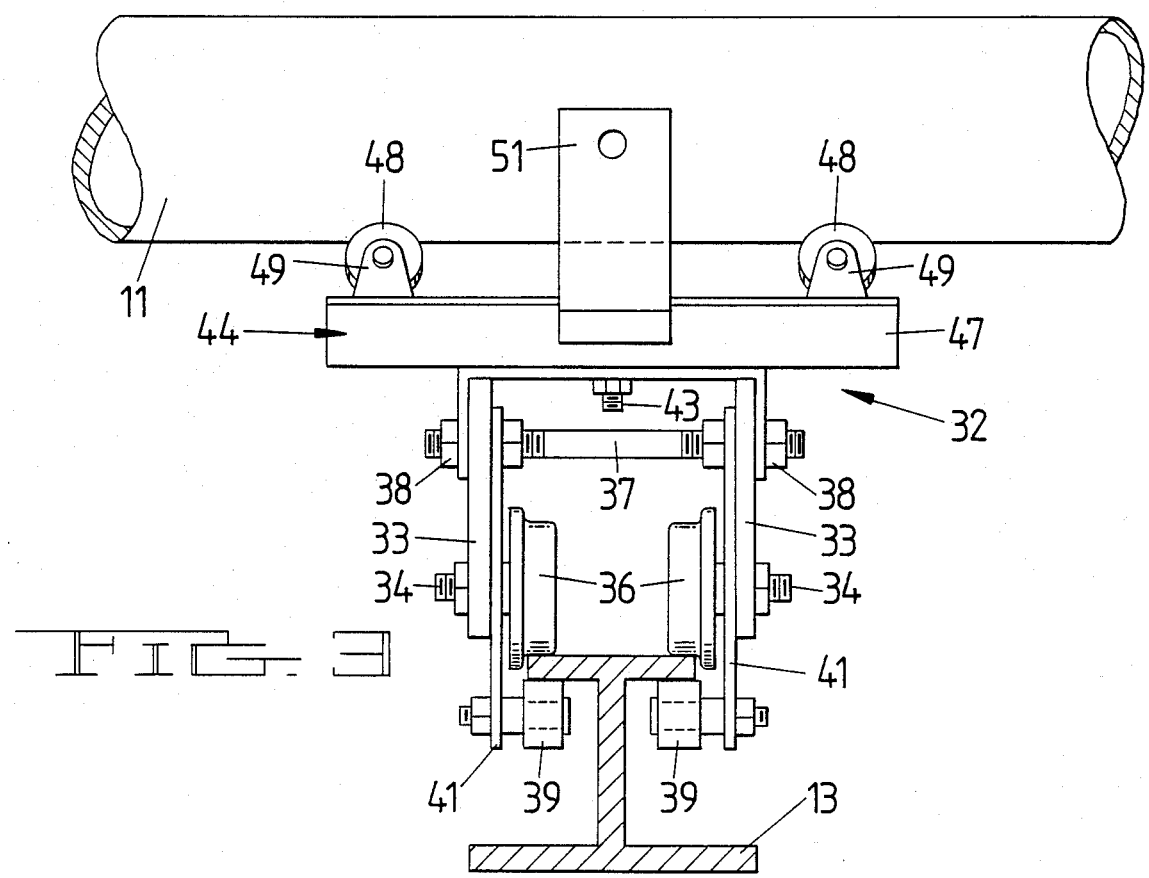

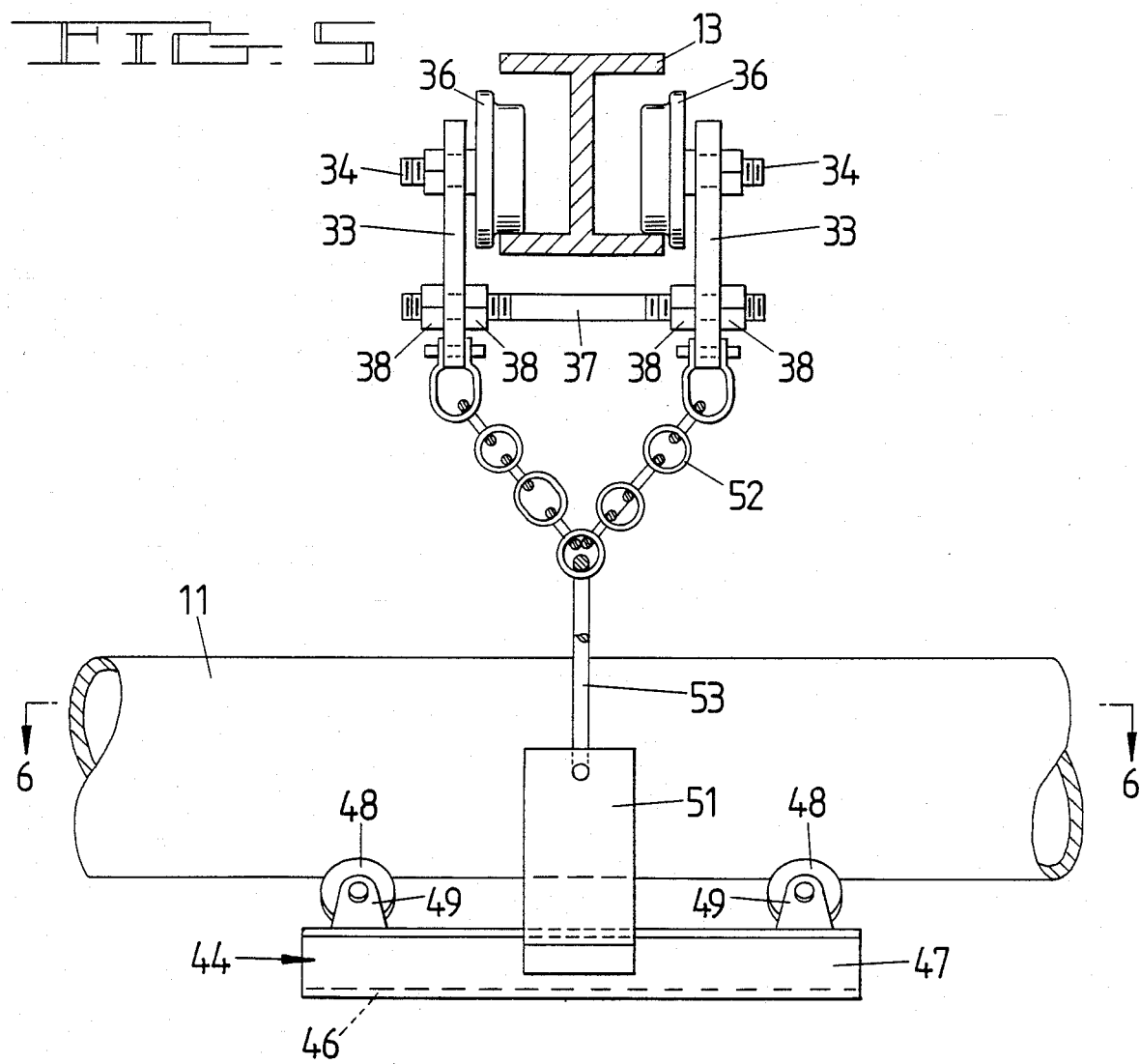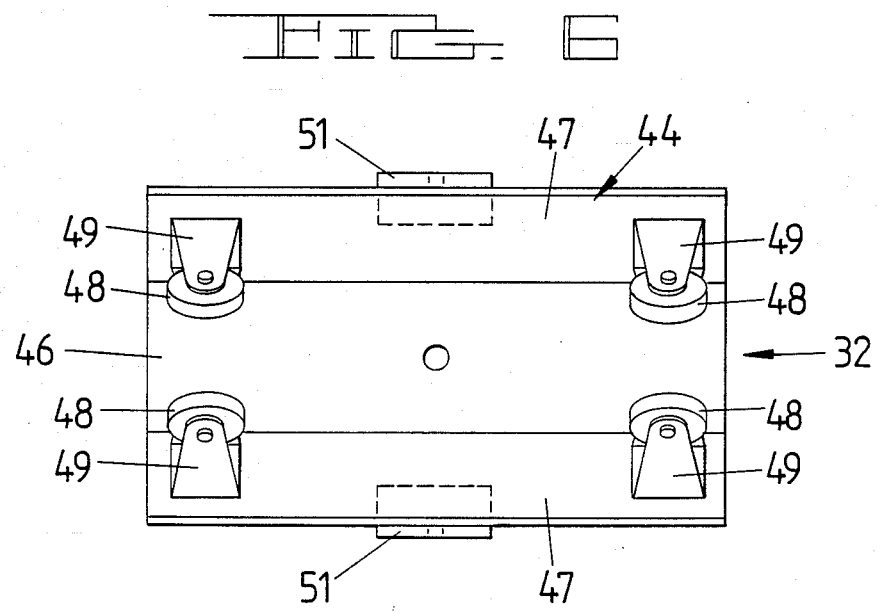

CONCRETE DELIVERY TROLLEY

FIELD OF THE INVENTION

The present invention relates to construction and particularly to concrete construction wherein large volumes of plastic concrete are pumped through movable conduits to a discharge area where the concrete is "poured" to form structural members such as the floors of buildings. In even greater particularity the present invention may be described as an elevated cradle for moving a conduit about an area to facilitate the discharge of plastic concrete.

BACKGROUND OF THE INVENTION

It has become common practice to pump vast quantities of concrete through conduits to fill forms in building construction. Most notably concrete is pumped through such pipes in the construction of high-rise buildings. Of course the outlet of these conduits must be moved to discharge the plastic concrete in a somewhat uniform manner. Typically, the conduit is supported and moved by a gang of as many as twenty men who physically carry the conduit over the work area as the concrete is pumped therethrough. Obviously this is a very laborious and expensive way to dispense the concrete.

SUMMARY OF THE INVENTION

It is the principal object of the present invention to reduce the manpower requirements for spreading concrete pumped through a conduit.

Another object of the invention is to improve the efficiency of such an operation in terms of the time required.

Still another object of the invention is to improve the safety of environment for the workers handling concrete discharge conduits.

These and other objects and advantages are accomplished in my invention through the use of a trolley which supports the concrete conduit and allows it to move over the area wherein the concrete is discharged. The trolley itself must be such that it is readily movable, thus it is supported on a beam which extends transversely of the discharge conduit. The trolley engages the beam with a set of rollers such that the trolley and supported conduit are movable along the length of the beam. A cradle member incorporated into the trolley extends along the axis of the conduit and allows the conduit to move axially therein. The beam is provided with a set of stands with adjustable legs such that the beam and trolley may be positioned at a desired height.

BRIEF DESCRIPTION OF THE DRAWINGS

Apparatus embodying features of my invention are depicted in the accompanying drawings which form a portion of this disclosure and wherein:

FIG. 2 is an elevational view of the apparatus taken along the axis of the conduit;

FIG. 3 is an elevational view of the apparatus taken along the axis of the beam;

FIG. 5 is an elevational view of the embodiment of FIG. 4 taken along the axis of the beam; and FIG. 6 is a plan view of the cradle.

DESCRIPTION OF THE PREFERRED EMBODIMENTS

Figure 1:
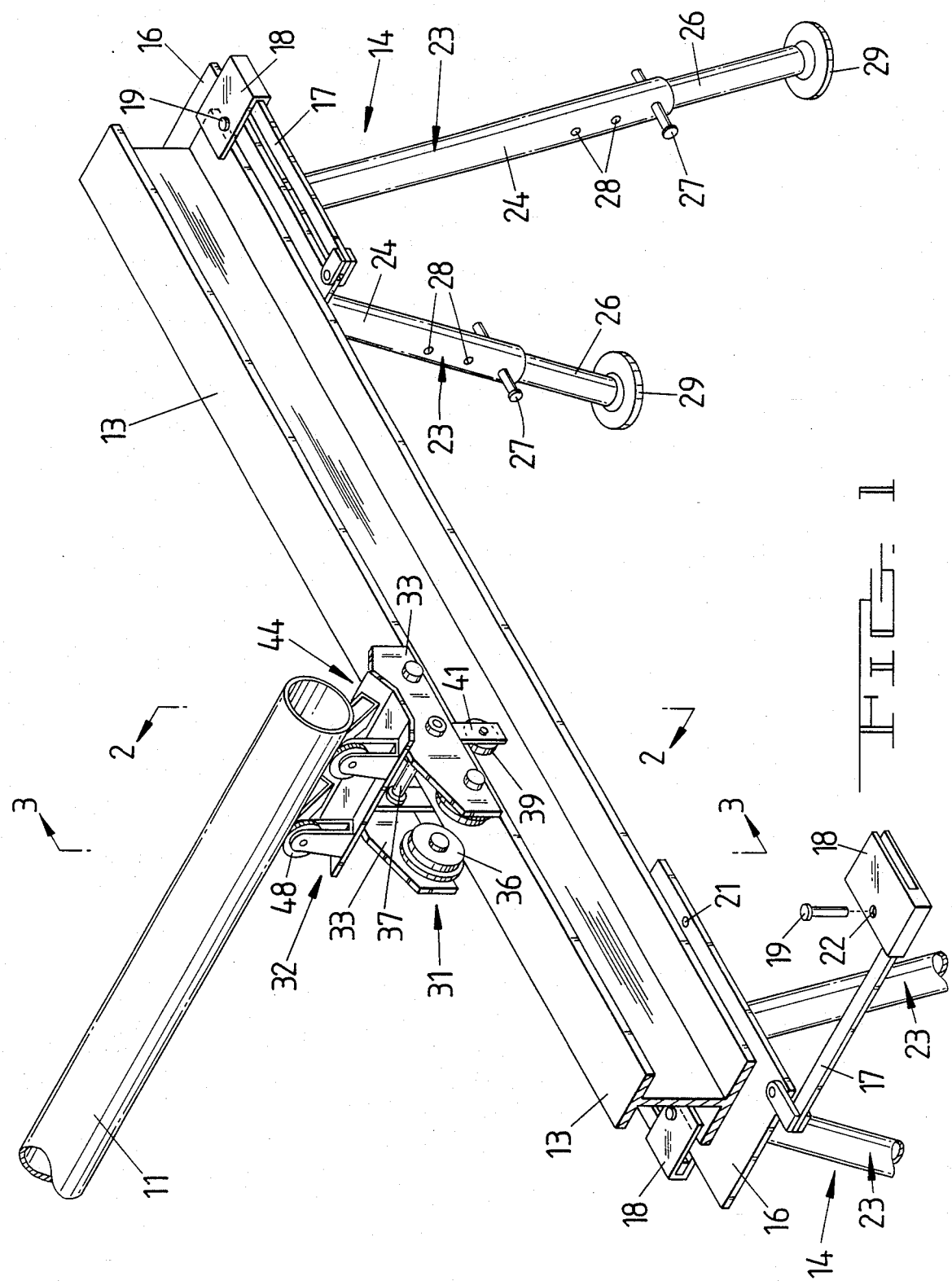
FIG. 1 is a perspective view of my apparatus supporting a segment of a concrete discharge conduit.

Referring to the Figures for a clearer understanding of the invention, FIG. 1 shows a concrete pipeline or conduit 11 which is commonly used to convey plastic concrete from a pump location to a discharge location. As will be appreciated, the conduit 11 must itself be substantial to carry the weight of the concrete pumped therethrough. Normally the conduit 11 has a diameter of about four to six inches. The present invention supports the pipe on a trolley assembly 12, which is in turn supported on a beam 13, such as a structural I beam which is adjustably supported on a set of beam stands 14.

The beam stands 14 utilize a top plate 16 which is wider than the flanges on the beam 13. On diagonal corners of the top plate 16 are a pair of pivotally mounted locking arms 17 which terminate in clevislike locking clamps 18. Each locking clamp 18 is dimensioned to receive the top plate 16 and the lower flange of the beam 13 within its clevis-like structure. A pin 19 is insertable through a set of apertures 21 and 22 in each top plate 16 and locking clamp 18 to lock the top plate 16 to the beam 13. The pins 19 may include a cotter key (not shown) to prevent inadvertent removal of the pin 19. A set of telescoping tubular legs 23 are welded to the bottom of the top plate 16 and are provided with an upper portion 24 and lower portion 26 which are incrementally adjustable by insertion of a pin 27 through one of a set of aligned apertures 28. A footpad 29 at the bottom of each lower portion 26 adds stability to the beam stand 14, a number of which may be placed along the length of the beam 13 as needed.

The trolley 12 includes a carriage assembly 31 and a cradle assembly 32 supported thereby. The carriage assembly includes a pair of vertical side plates 33, each of which carries a pair of stub axles 34 on which are mounted a pair of beam rollers 36. The side plates 33 are spaced apart by a spanning rod 37, which is threaded along its length for engagement with a set of positioning nuts 28, such that the beam rollers 36 carried by each side plate 33 face inwardly and rest on the flange of the beam 13. The carriage assembly 31 may also be provided with a wt of guide rollers 39 connected thereto by a strap 41. The guide rollers 29 engage the flange on the side thereof opposite the beam roller 36 to prevent separation of the carriage assembly 31 from the beam 13.

The cradle assembly 32 may be supported by the carriage assembly 31 in the manner of the two embodiments shown in FIGS. 1–3 or FIGS. 4 & 5 respectively. In the embodiment illustrated in FIGS. 1–3 a mounting strap 42 extends across the top of the carriage assembly 31 between side plates 33 and is secured to the spanning rod 37. The cradle assembly is attached to the mounting strap 42 by a nut and bolt combination 43. The cradle assembly 32 includes a base plate 44 which is preferentially shaped with a horizontal central portion 46, which is aligned with mounting strap 42, and a pair of lateral upwardly and outwardly extending portions 47. Each upwardly and outwardly extending portion 47 carries on its upper surface a set of rollers 48 mounted on support brackets 49 affixed to the base plate. The rollers 48 engage the conduit 11 along intersecting planes which bisect the conduit 11 so that lateral forces are transmitted to the carriage and cause the trolley 12 to move along the beam 13 while longitudinal forces on the conduit 11 cause the conduit to move axially on the cradle 32. A pair of side guides 51 extend upwardly from the lateral portion 27 to stop the conduit in instances where the lateral forces urge the conduit off the rollers 48.

Figure 4:
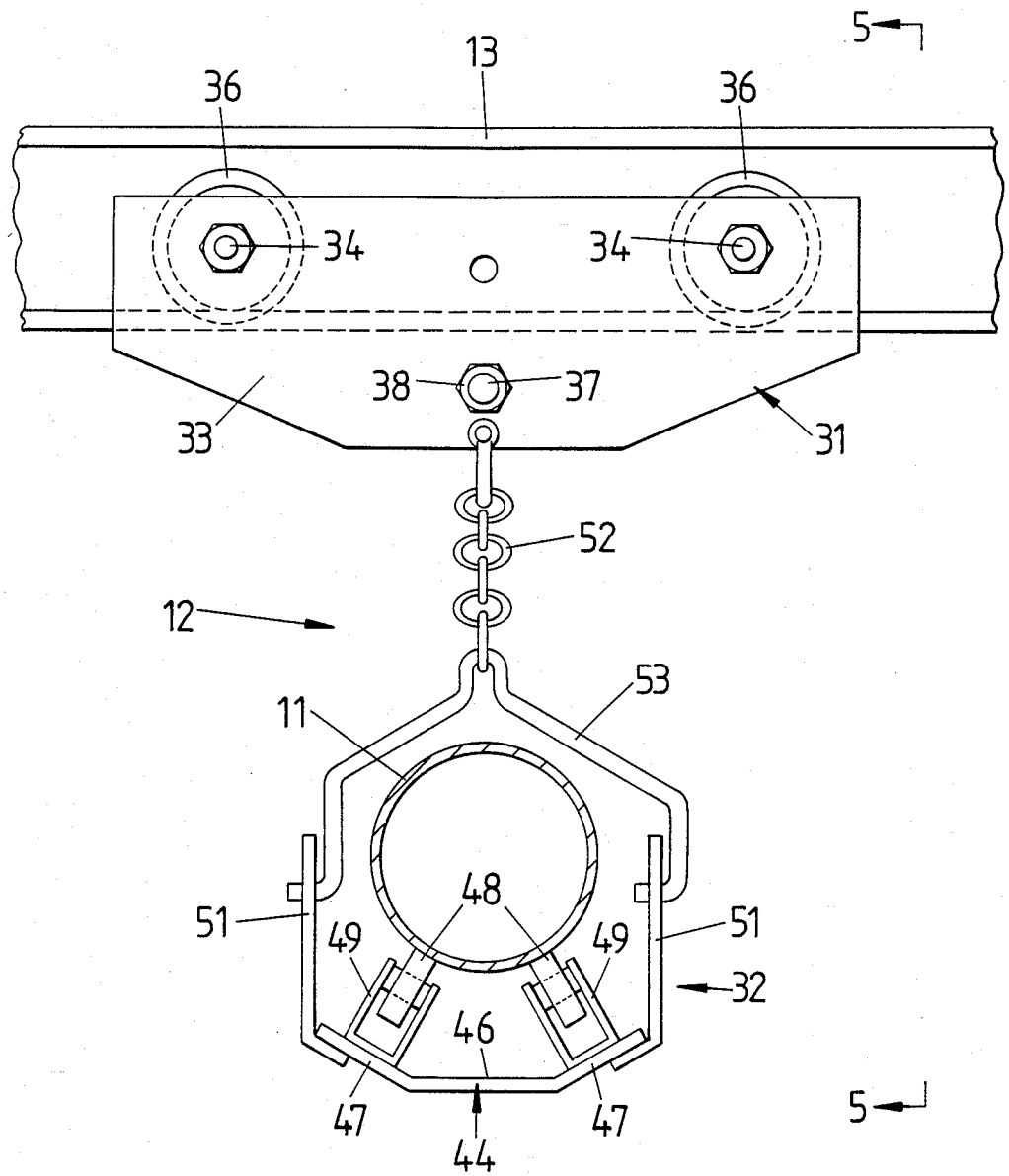
FIG. 4 is an elevational view of an alternate embodiment taken along the axis of the conduit.

FIGS. 4 and 5 illustrate a second embodiment wherein the cradle assembly 32 is suspended beneath the carriage assembly 31. In this embodiment the carriage assembly 31 is inverted with the beam rollers 36 engaging the top surfaces of the lower flange on the beam 13. Mounting strap 42 has been replaced by a chain yoke 52 which attaches to each side plate 33 and to a hanger bracket 53 which engages in a pair of apertures 54 in the side guards 51. Obviously this embodiment requires substantial span length along the beam 13 between beam stands 14.

From the foregoing it should be clear that my apparatus is capable of converting what is customarily a job performed by a gang of men into a job that can be easily performed by a few men at a significant cost savings.

While I have shown my invention in two forms, it will be obvious to those skilled in the art that it is not so limited but is susceptible of various changes and modifications without departing from the spirit thereof.

What I claim is:

1. Apparatus for movably supporting a conduit for delivering a concrete slurry at a construction site comprising:
   (a) a support beam extending transversely of the longitudinal axis of said conduit at a predetermined height;
   (b) a carriage member supported for movement along said support beam;
   (c) a cradle member carried by said carriage member and having a plurality of roller-like members therein for engaging said conduit such that said conduit, cradle member, and carriage member are movable concomitantly along said support beam responsive to force exerted thereon substantially parallel to said beam; and
   (d) means for adjusting the height of said beam including a plurality of legs of selectable length and a beam engaging member.

2. Apparatus as defined in claim 1 wherein said means for adjusting comprises:
   (a) a plate-like member positioned subjacent said beam and extending transversely beyond said beam;
   (b) a pair of legs affixed to said plate with each leg including means for adjusting the length thereof; and
   (c) clamp members mounted on said plate for securing said beam to said plate.

3. Apparatus as defined in claim 1 wherein said support beam has opposed transversely extending flanges along the length thereof with said carriage member engaging said flanges.

4. Apparatus as defined in claim 3 wherein said carriage member comprises:
   (a) a pair of vertical side plates positioned on opposite sides of said beam;
   (b) means for securing said vertical plates to each other in spaced relation; and
   (c) a plurality of beam engaging rollers supported by said vertical side plates and intermediate said vertical side plates.

5. Apparatus as defined in claim 4 wherein said cradle member comprises a cradle frame extending parallel to said conduit, with said roller-like members supported thereon to supportingly engage said conduit at points on opposite sides of the center of said conduit with said rollers being separated by less than 180° about the circumference of said conduit; and means for securing said cradle frame to said carriage member.

6. Apparatus as defined in claim 4 wherein said cradle member comprises:
   (a) an elongated base member extending transversely of said support beam;
   (b) means for attaching said base member to said vertical plates for support thereon; and
   (c) a plurality of roller members supported on said base member for receiving said conduit thereon.

7. Apparatus as defined in claim 1 wherein said cradle member comprises:
   (a) an elongated base member extending transversely of said support beam;
   (b) means for attaching said base member to said carriage member for support thereon; and
   (c) a plurality of roller members supported on said base member for receiving said conduit thereon.

8. Apparatus as defined in claim 7 wherein said means for attaching comprises a flexible yoke depending from said carriage and supporting said base member beneath said support beam.

9. Apparatus for movably supporting a conduit for delivering a concrete slurry at a construction site comprising:
   (a) a support beam having opposed transversely extending flanges along the length thereof extending transversely of the longitudinal axis of said conduit at a predetermined height;
   (b) a carriage member supported for movement along said support beam with said carriage member engaging said flanges and having:
      (1) a pair of vertical side plates positioned on opposite sides of said beam;
      (2) means for securing said vertical plates to each other in spaced relation;
      (3) a plurality of beam engaging rollers supported by said vertical side plates and intermediate said vertical side plates; and
   (c) a cradle member carried by said carriage member and having a plurality of roller-like members therein for engaging said conduit such that said conduit, cradle member, and carriage member are movable concomitantly along said support beam responsive to force exerted thereon substantially parallel to said beam.

10. Apparatus as defined in claim 9 further comprising means for adjusting the height of said beam including a plurality of legs of selectable length and a beam engaging member.

11. Apparatus as defined in claim 9 wherein said cradle member comprises a cradle frame extending parallel to said conduit, with said roller-like members supported thereon to supportingly engage said conduit at points on opposite sides of the center of said conduit with said rollers being separated by less than 180° about the circumference of said conduit; and means for securing said cradle frame to said carriage member.

12. Apparatus for supporting a concrete slurry delivery conduit as it moves over an area delivering concrete slurry comprising:

(a) one or more stabilized elongated support beams located at a predetermined height relative to said area;
(b) a carriage mounted on said support beam for movement longitudinally thereon;
(c) a conduit engaging cradle member supported for concomitant motion therewith on said carriage; and
(d) means for adjusting the height of said beam including a plurality of legs of selectable length and a beam engaging member.

13. Apparatus as defined in claim 12 wherein said cradle member comprises:
(a) an elongated base member extending transversely of said support beam;
(b) means for attaching said base member to said carriage member for support thereon; and
(c) a plurality of roller members supported on said base member for receiving said conduit thereon.

14. Apparatus as defined in claim 12 wherein said carriage member comprises:
(a) a pair of vertical side plates positioned on opposite sides of said beam;
(b) means for securing said vertical plates to each other in spaced relation; and
(c) a plurality of beam engaging rollers supported by said vertical side plates and intermediate said vertical side plates.

15. Apparatus as defined in claim 12 wherein said means for adjusting comprises:
(a) a plate-like member positioned subjacent said beam and extending transversely beyond said beam;
(b) a pair of legs affixed to said plate with each leg including means for adjusting the length thereof; and
(c) clamp members mounted on said plate for securing said beam to said plate.

* * * * *